United States Patent
Liao

(10) Patent No.: US 7,537,373 B2
(45) Date of Patent: May 26, 2009

(54) LIGHT GUIDE PLATE AND BACKLIGHT MODULE USING THE SAME

(75) Inventor: Ming-Yi Liao, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 59 days.

(21) Appl. No.: 11/501,951

(22) Filed: Aug. 10, 2006

(65) Prior Publication Data
US 2007/0139965 A1 Jun. 21, 2007

(30) Foreign Application Priority Data
Nov. 18, 2005 (TW) .............................. 94140640 A

(51) Int. Cl.
*F21V 13/04* (2006.01)
(52) U.S. Cl. ...................... 362/619; 362/615; 362/617; 362/600; 362/620
(58) Field of Classification Search .......... 362/600–634
See application file for complete search history.

(56) References Cited

U.S. PATENT DOCUMENTS 6,347,873 B1 * 2/2002 Hosseini et al. ............. 362/624

6,671,452 B2 * 12/2003 Winston et al. ............. 385/146

FOREIGN PATENT DOCUMENTS

| CN | 1427288 A | 7/2003 |
|---|---|---|
| JP | 11-24586 | 1/1999 |
| JP | 2003-232933 A | 8/2003 |
| WO | WO 2005036245 A1 | 4/2005 |

* cited by examiner

*Primary Examiner*—Anabel M Ton

(57) ABSTRACT

A light guide plate (30) includes a light incident surface (31), a light emitting surface (32) and a bottom surface (33). The light emitting surface adjoins the light incident surface. The bottom surface faces an opposite direction of the light emitting surface. A number of first microstructure units (321) and second microstructure units (323) are interlaced and formed on the light emitting surface. Each first microstructure unit has a number of first prism lenses (3211) extending out from the light emitting surface parallel to the light incident surface, and each second microstructure unit has a number of second prism lenses (3231) extending out from the light emitting surface perpendicular to the light incident surface.

16 Claims, 6 Drawing Sheets

LIGHT GUIDE PLATE AND BACKLIGHT MODULE USING THE SAME

TECHNICAL FIELD

The present invention generally relates to light guide plates and backlight modules using the same.

BACKGROUND

Most liquid crystal display (LCD) devices are passive devices in which images are displayed by controlling an amount of light inputted from an external light source. Thus, a separate light source (for example, backlight module) is generally employed for illuminating an LCD panel.

Generally, backlight module includes a light source, a light guide plate, a reflective sheet, and a diffusion sheet. The light guide plate includes a light incident surface, a light emitting surface adjoining the light incident surface, and a bottom surface facing an opposite direction of the light emitting surface. The light source is located adjacent to the light incident surface of the light guide plate. The light guide plate is located between the reflective sheet and the diffusion sheet with the bottom surface adjacent to the reflective sheet and the light emitting surface adjacent to the diffusion sheet. When light produced by the light source is emitted into the light guide plate, the light guide plate redirects the light. The reflective sheet reflects the light scattered towards the reflective sheet back towards the light guide plate to increase utilization efficiency of light energy. The diffusion sheet diffuses the light emitted from the light guide plate, thus, a brightness of the light incident on the LCD panel would be more uniform.

One kind of light guide plate is illustrated in FIGS. 1 and 2. A light guide plate 10 includes a light incident surface 11, a light emitting surface 12 adjoining the light incident surface 11, and a bottom surface 13 facing an opposite direction of the light emitting surface 12. In order to improve optical uniformity, a plurality of patterned dots 131 is formed at the bottom surface 13. Light produced by a light source (not shown) is emitted towards the pattern dots 131 via the light incident surface 11. Light is scattered by the patterned dots 131 before emitted out the light emitting surface 12 of the light guide plate 10. However, the light guide plate 10 has difficulties emitting light to project approximately in a perpendicular direction of the light emitting surface 12, thus decreasing the brightness of the emitted light.

Another kind of light guide plate is illustrated in FIGS. 3 and 4. A light guide plate 20 includes a light incident surface 21, a light emitting surface 22 adjoining the light incident surface 21, and a bottom surface 23 facing an opposite direction of the light emitting surface 22. In order to obtain a uniform light energy distribution, a plurality of V-shaped structures 221 are formed on the light emitting surface 22. The V-shaped structures 221 extend out of the emitting surface 22 regularly and periodically in a direction parallel to a Y-axis and parallel to each other. Light produced by a light source (not shown) is guided towards the V-shaped structures 221, and most of the light guided towards the V-shaped structures 221 is then refracted by the V-shaped structures 221. The light guide plate 20 is able to project the refracted light at approximately a perpendicular direction to the V-shaped structures 221. That is to say, the refracted light is substantially aligned with the Z-axis in a XOZ coordinate system. However, the light guide plate 20 is easy to generate Newton ring interference action because the V-shaped structures 221 extend out of the emitting surface 22 regularly and periodically in a direction, thereby decreasing the optical uniformity.

Therefore, a new light guide plate and a backlight module using the same are desired in order to overcome the above-described shortcomings.

SUMMARY

A light guide plate according to a preferred embodiment includes a light incident surface, a light emitting surface and a bottom surface. The light emitting surface adjoins the light incident surface. The bottom surface faces an opposite direction of the light emitting surface. A number of first microstructure units and second microstructure units are interlaced and formed on the light emitting surface. Each first microstructure unit has a number of first prism lenses extending out from the light emitting surface parallel to the light incident surface, and each second microstructure unit has a number of second prism lenses extending out from the light emitting surface perpendicular to the light incident surface.

A backlight module according to another preferred embodiment includes at least a light source and a light guide plate having a light incident surface. The light source is positioned adjacent to the light incident surface of the light guide plate. The same light guide plate described in the previous paragraph is employed in this embodiment.

Other novel features will become more apparent from the following detailed description when taken in conjunction with the accompanying drawings.

BRIEF DESCRIPTION OF THE DRAWINGS

Many aspects of the light guide plate and the backlight module using the same can be better understood with reference to the following drawings. The components in the drawings are not necessarily drawn to scale, the emphasis instead being placed upon clearly illustrating the principles of the present light guide plate and the backlight module using the same. Moreover, in the drawings, like reference numerals designate corresponding parts throughout the several views.

DETAILED DESCRIPTION OF THE EMBODIMENTS

Figure 1:
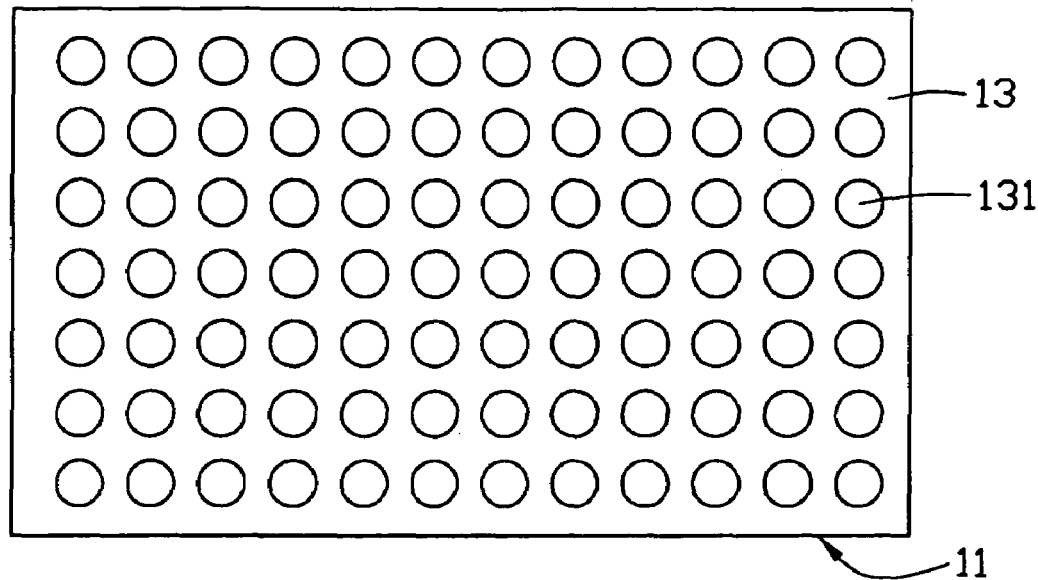
FIG. 1 is a schematic, bottom plan view of a conventional light guide plate.
Figure 2:
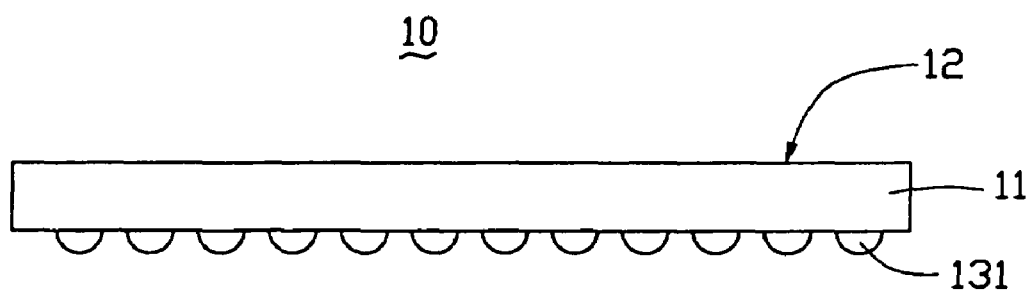
FIG. 2 is a schematic, front plan view of the light guide plate as shown in FIG. 1.
Figure 3:
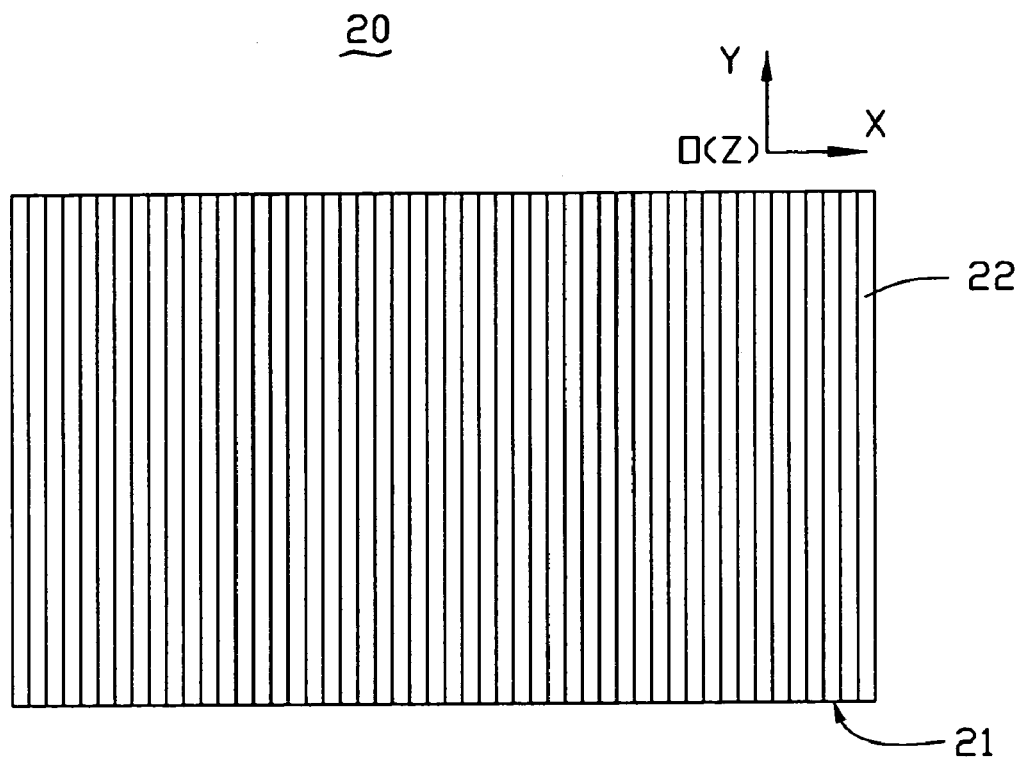
FIG. 3 is a schematic, top plan view of another conventional light guide plate.
Figure 4:
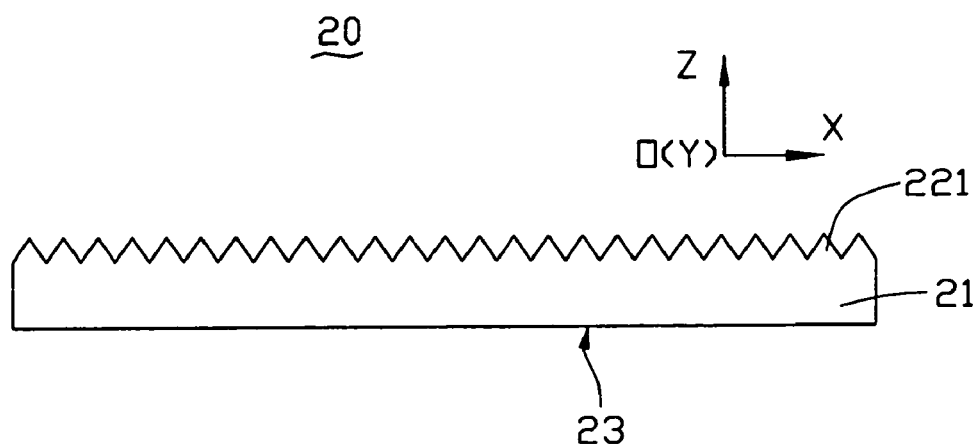
FIG. 4 is a schematic, front plan view of the light guide plate as shown in FIG. 3.
Figure 5:
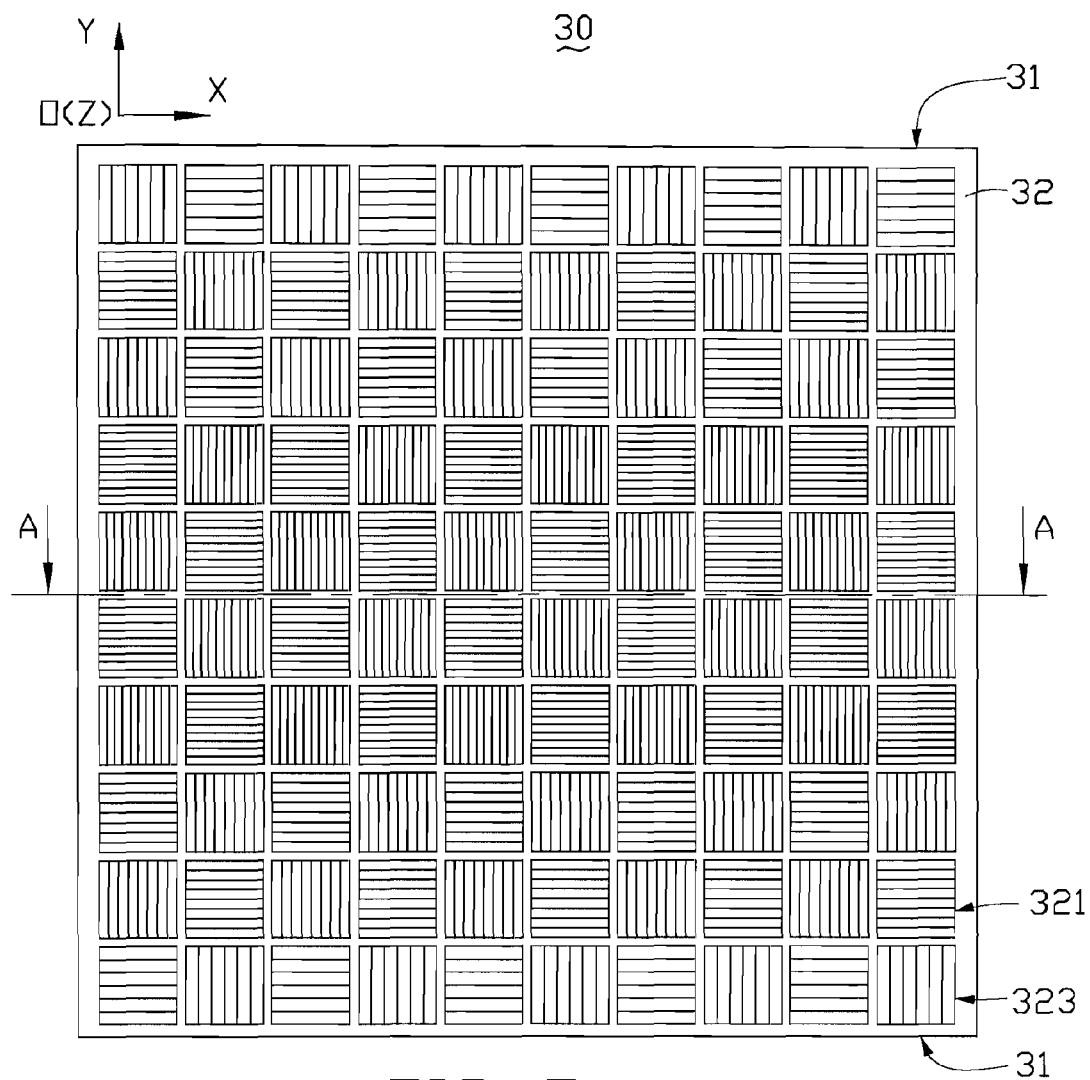
FIG. 5 is a schematic, top plan view of a light guide plate in accordance with a first embodiment.
Figure 6:
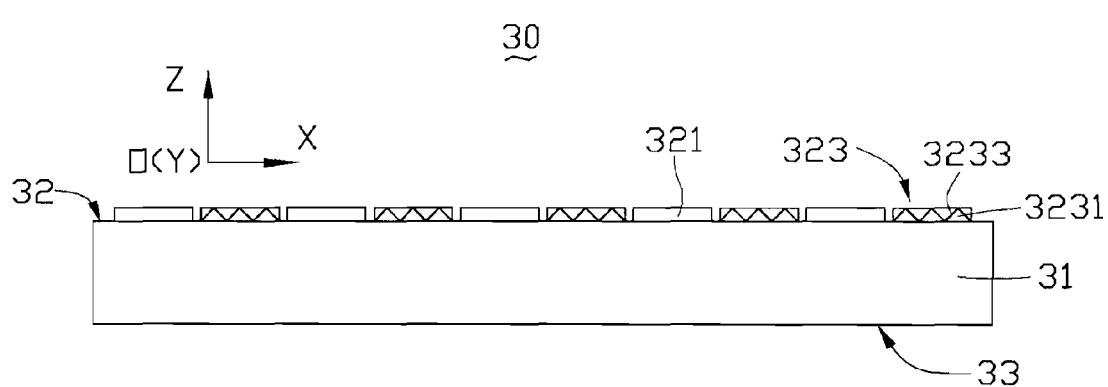
FIG. 6 is a schematic, front plan view of the light guide plate as in FIG. 5.

Referring to FIG. 5, a light guide plate 30 according to a first embodiment of the present invention is shown. The light guide plate 30 is configured for converting point/line light sources into surface light sources in a uniform light energy distribution. Referring also to FIG. 6, the light guide plate 30 is a rectangular sheet, or alternatively may be generally cuneiform. In the illustrated embodiment, the light guide plate 30 is a rectangular sheet. The light guide plate 30 includes a pair of light incident surfaces 31 located at two opposite sidewalls of the light guide plate 30, a light emitting surface 32 located at a top surface of the light guide plate 30 adjoining the two light incident surfaces 31, and a bottom surface 33 facing an opposite direction of the light emitting surface 32. The light emitting surface 32 has an imaginary center line A-A that is parallel to the light incident surfaces 31, and divides the light emitting surface 32 into two symmetrical light emitting portions. The bottom surface 33 is flat.

Figure 7:
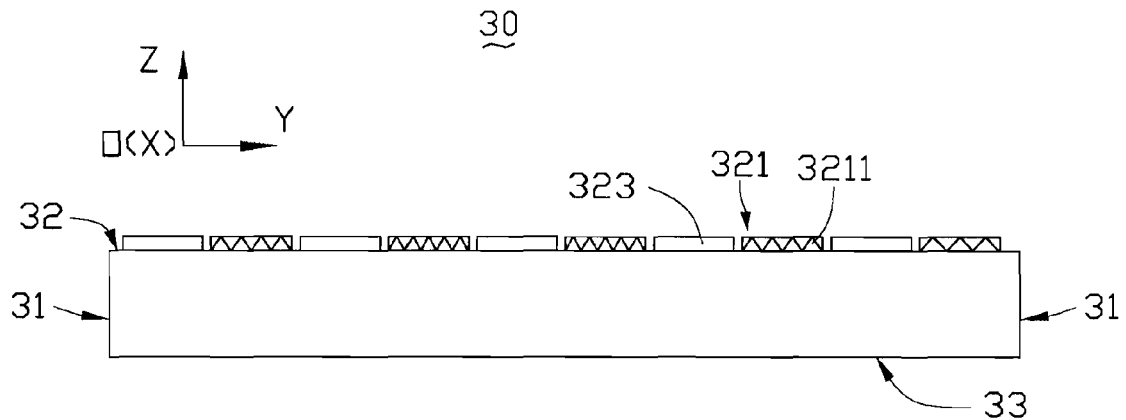
FIG. 7 is a schematic, left plan view of the light guide plate as in FIG. 5.
Figure 11:
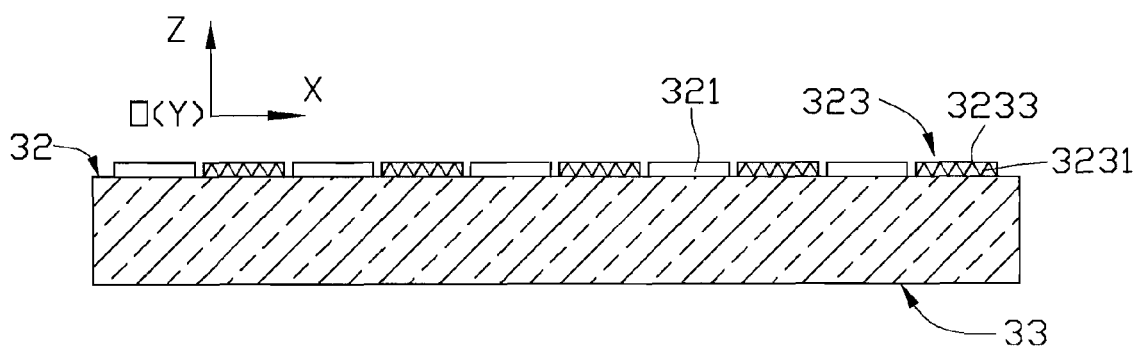
FIG. 11 is a schematic, cross-sectional view of the light guide plate as in FIG. 5, taken along line A-A thereof.

Referring also to FIG. 7 and FIG. 11, a plurality of first microstructure units 321 and second microstructure units 323 are spaced, interlaced, and formed on the light emitting surface 32 of the light guide plate 30 in a matrix manner. Each first microstructure unit 321 includes a plurality of first prism lenses 3211. Each first prism lens 3211 is substantially an elongated V-shaped protrusion. The first prism lenses 3211 extend out of the emitting surface 32 regularly in a direction parallel to an X-axis and parallel to each other. A vertex edge of each first prism lens 3211 is substantially sharp-shaped. Each second microstructure unit 323 includes a plurality of second prism lenses 3231. Each second prism lens 3231 is substantially an elongated V-shaped protrusion. The second prism lenses 3211 extend out of the emitting surface 32 regularly and periodically in a direction parallel to a Y-axis and parallel to each other. A vertex edge of each second prism lens 3231 is substantially sharp-shaped. An area of each first microstructure unit 321 is equal to that of each second microstructure unit 323. In each light emitting portion, a quantity of the first and second prism lenses 3211 and 3231 of the first and second microstructure units 321 and 323 respectively, increases at regular intervals with increasing distance from the incident surface 31 to the imaginary center line A-A.

A material of the light guide plate 30 can be selected, for example, from a group consisting of polymethyl methacrylate (PMMA), polycarbonate (PC), and other suitable transparent resin materials.

Figure 8:
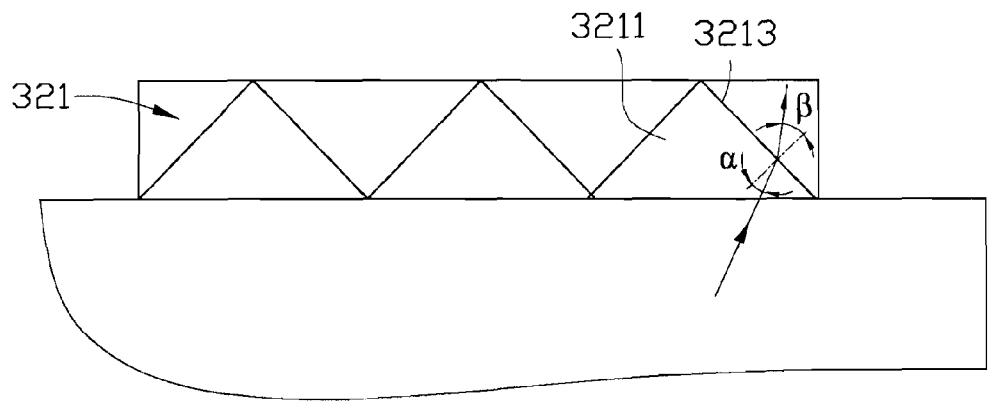
FIG. 8 is an enlarged, schematic view of a first microstructure unit as shown in FIG. 7.

When the light guide plate 30 is in use, light produced by a light source (not shown) is projected towards the light incident surface 31 of the light guide plate 30. The light guide plate 30 redirects the light, the light is refracted and reflected at the first and second microstructure units 321 and 323, before emitting out of the light guide plate 30. Referring also to FIG. 8, when the light is emitted towards a side surface 3213 of the first microstructure unit 321, most of the light is refracted. A light emitting angle β is greater than a light incident angel α. In this state, the refracted light is substantially aligned with the Z-axis in a YOZ coordinate system. In a same way, when the light is emitted towards a side surface 3233 of the second microstructure unit 323, most of the light is refracted. A light emitting angle is greater than a light incident angle. In this state, the refracted light is substantially aligned with the Z-axis in a XOZ coordinate system.

In the above-described light guide plate 30, an area of each first microstructure unit 321 relative to an area of the light emitting surface 32 is very small. Also, an area of each second microstructure unit 323 relative to the area of the light emitting surface 32 is very small, too. In addition, the first and second microstructure units 321 and 323 are interlaced and located on the light emitting surface 32 in the matrix manner. Therefore, the light guide plate 30 can emit light projecting approximately at a perpendicular direction of the light emitting surface 32. That is to say, the light is emitted from the light guide plate 30 at an approximate perpendicular direction to the light emitting surface 32, the light emitted is then emitted approximately perpendicularly to an LCD panel (not shown). On the other hand, the light guide plate 30 is difficult to generate Newton ring interference action, thus improving optical uniformity. Furthermore, in each light emitting portion, a quantity of the first and second prism lenses 3211 and 3231 of the first and second microstructure units 321 and 323 respectively, increases at regular intervals with increasing distance from the incident surface 31 to the imaginary center line A-A. Thus, the brightness of the light emitted from the light guide plate 30 would be more uniform.

In other alternative embodiments, the first microstructure units 321 and the second microstructure units 323 could be interlaced continuously on the light emitting surface 32 of the light guide plate 30. The area of each first microstructure unit 321 and second microstructure unit 323 may be different.

Figure 9:
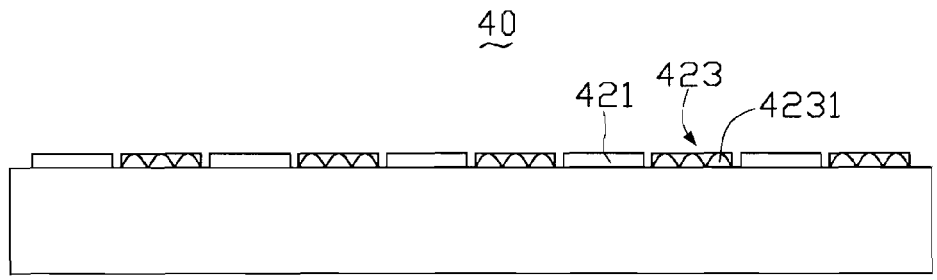
FIG. 9 is a schematic, front plan view of a light guide plate in accordance with a second embodiment.

Referring to FIG. 9, a light guide plate 40 according to a second embodiment of the present invention is shown. The light guide plate 40 includes a plurality of first microstructure units 421 and second microstructure units 423. Each first microstructure unit 421 includes a plurality of first prism lenses (not labeled). Each second microstructure unit 423 includes a plurality of second prism lenses 4231. The light guide plate 40 is similar in principle to the light guide plate 30 described previously, except that a vertex edge of each first prism lens is substantially circular-shaped, and a vertex edge of each second prism lens 4231 is substantially circular-shaped. In alternative embodiments, the vertex edge of each first prism lens could be arc-shaped or be of another suitable shape. The vertex edge of each second prism lens 4231 could be arc-shaped or be of another suitable shape.

Figure 10:
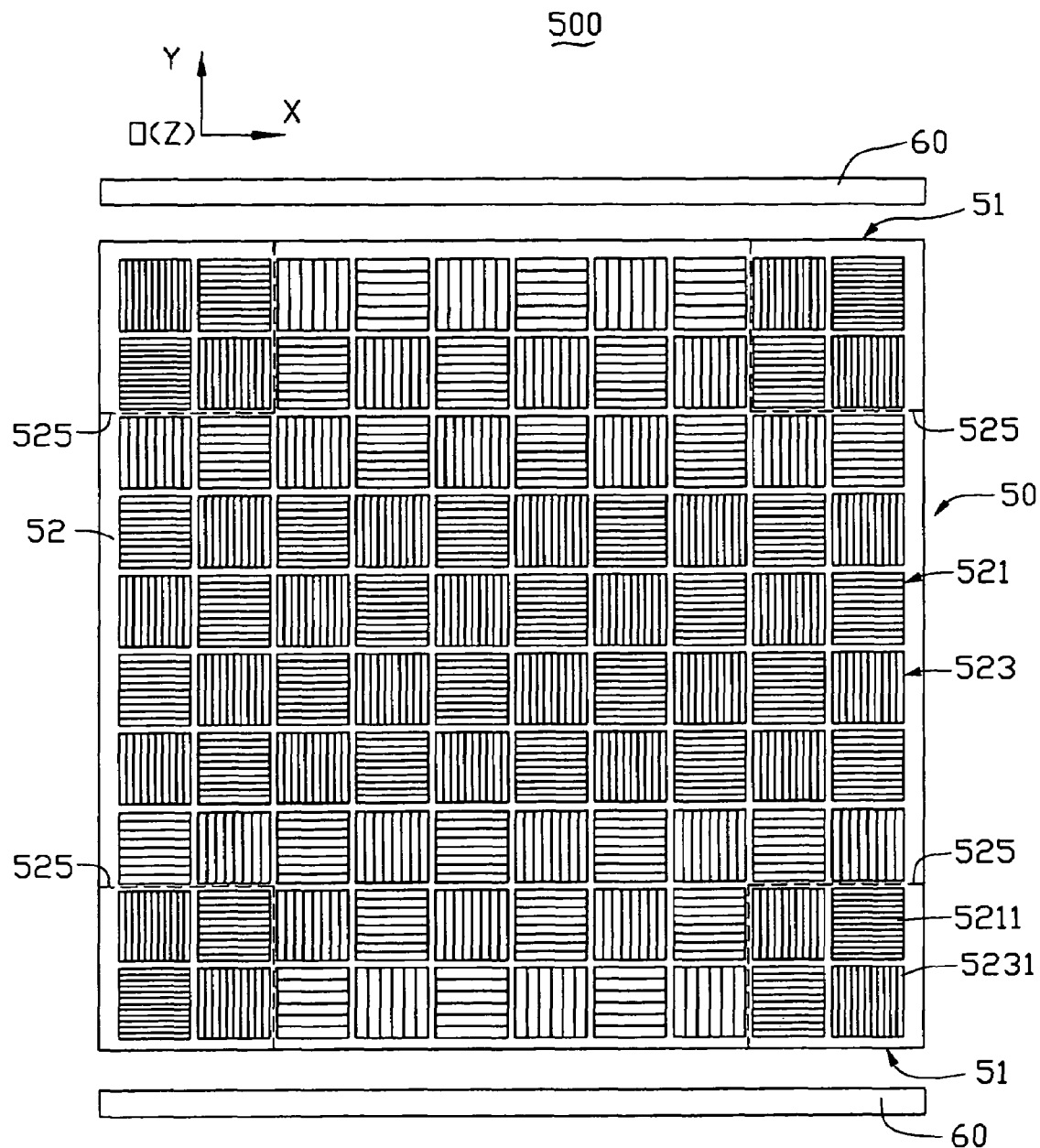
FIG. 10 is a schematic, top plan view of a backlight module in accordance with a third embodiment.

Referring to FIG. 10, a backlight module 500 according to a third embodiment of the present invention is shown. The backlight module 500 includes a light guide plate 50 and a pair of light sources 60. The light sources 60 can be selected, for example, from a group consisting of cold cathode fluorescent lamps (CCFLs) and light emitting diodes (LEDs). In the illustrated embodiment, the light sources 60 are CCFLs. The light guide plate 50 includes a pair of light incident surfaces 51 located at two opposite sidewalls of the light guide plate 50, a light emitting surface 52 located at a top surface of the light guide plate 50 adjoining the two light incident surfaces 51, and a bottom surface (not shown) facing an opposite direction of the light emitting surface 52. The light sources 60 are located adjacent to the light incident surfaces 51 of the light guide plate 50 respectively. A plurality of first microstructure units 521 and second microstructure units 523 are spaced, interlaced, and formed on the light emitting surface 52 of the light guide plate 50 in a matrix manner. Each first microstructure unit 521 includes a plurality of first prism lenses 5211. Each second microstructure unit 523 includes a plurality of second prism lenses 5231. The light guide plate 50 is similar in principle to the light guide plate 30 described previously, except that a quantity of the first and second prism lenses 5211 and 5231 of the first and second microstructure units 521 and 523 respectively, is greater in a particular area, for example, four corresponding corners 525 of the light emitting surface 52. Therefore improving the brightness of the light emitted from the particular district of the light guide plate 50.

In alternative embodiments, the light guide plate includes a light incident surface, a light emitting surface adjoining the light incident surface, and a bottom surface facing an opposite direction of the light emitting surface. A plurality of first microstructure units and second microstructure units are interlaced formed on the light emitting surface. Each first microstructure unit has a plurality of first prism lenses extending out from the light emitting surface parallel to the light incident surface. Each second microstructure unit has a plurality of second prism lenses extending out from the light emitting surface perpendicular to the light incident surface.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guide plate, comprising:
   a light incident surface;
   a light emitting surface adjoining the light incident surface;
   a bottom surface facing an opposite direction of the light emitting surface; and
   a plurality of first microstructure units and second microstructure units interlaced, and formed on the light emitting surface, wherein each first microstructure unit has a plurality of first prism lenses extending out from the light emitting surface parallel to the light incident surface, and each second microstructure unit has a plurality of second prism lenses extending out from the light emitting surface perpendicular to the light incident surface, a quantity of either of the first and second prism lenses increases at regular intervals with increasing distance from the incident surface.

2. The light guide plate as claimed in claim 1, wherein an area of each first microstructure unit is configured to be equal to that of each second microstructure unit.

3. The light guide plate as claimed in claim 1, wherein a vertex edge of either of the first prism lens and the second prism lens is one of sharp-shaped and circular-shaped.

4. The light guide plate as claimed in claim 1, wherein a quantity of the first prism lenses of the first microstructure units is greater at four corner of the light emitting surface than that in other area of the light guide plate.

5. The light guide plate as claimed in claim 1, wherein a quantity of the second prism lenses of the second microstructure units is greater at four corner of the light emitting surface than that in other area of the light guide plate.

6. The light guide plate as claimed in claim 1, further comprising a second light incident surface, wherein the second light incident surface and the light incident surface are located at two opposite sidewalls of the light guide plate, the light emitting surface has a center line, which is parallel to each light incident surface, and divides the light emitting surface into two symmetrical light emitting portions, in each light emitting portion, a quantity of the first and second prism lenses of the first and second microstructure units respectively, increases at regular intervals with increasing distance from the incident surface to the center line.

7. A backlight module comprising:
   at least a light source; and
   a light guide plate, the light guide plate including:
   a light incident surface, the light source being positioned adjacent to the light incident surface;
   a light emitting surface adjoining the light incident surface;
   a bottom surface facing an opposite direction of the light emitting surface; and
   a plurality of first microstructure units and second microstructure units interlaced formed on the light emitting surface, wherein each first microstructure unit has a plurality of first prism lenses extending out from the light emitting surface parallel to the light incident surface, and each second microstructure unit has a plurality of second prism lenses extending out from the light emitting surface perpendicular to the light incident surface, a quantity of either of the first and second prism lenses increases at regular intervals with increasing distance from the incident surface.

8. The backlight module as claimed in claim 7, wherein the light source is selected from a group comprising of a cold cathode fluorescent lamp and a light emitting diode.

9. The backlight module as claimed in claim 7, wherein an area of each first microstructure unit is configured to be equal to that of each second microstructure unit.

10. The light guide plate as claimed in claim 7, wherein the light guide plate further includes a second light incident surface, and the second light incident surface and the light incident surface are located at two opposite sidewalls of the light guide plate, the light emitting surface has a center line, which is parallel to each light incident surface, and divides the light emitting surface into two symmetrical light emitting portions, in each light emitting portion, a quantity of the first and second prism lenses of the first and second microstructure units respectively, increases at regular intervals with increasing distance from the incident surface to the center line.

11. A light guide plate comprising:
    a light incident surface through which light is allowed to emit into the light guide plate;
    a light emitting surface through which the light is allowed to emit out of the light guide plate; and
    a plurality of first and second microstructures formed on the light emitting surface in an interlaced fashion, each first microstructure including a plurality of first protrusions extending along a first direction, each second microstructure including a plurality of second protrusions extending along a second direction distinct from the first direction, wherein the distribution density of the first and second protrusions of the first and second microstructures is configured to be greater on a predetermined area of the light emitting surface than on other area thereof in a manner so as to increase optical uniformity.

12. The light guide plate as claimed in claim 11, wherein the first and second microstructures are arranged in a matrix manner.

13. The light guide plate as claimed in claim 11, wherein the distribution density of the first and second protrusions of the first and second microstructures is configured to gradually increase along a predetermined direction in a manner so as to increase optical uniformity.

14. The light guide plate as claimed in claim 13, wherein the predetermined direction refers to a direction away from the light incident surface.

15. The light guide plate as claimed in claim 11, wherein the predetermined area refers to corner portions of the light guide plate.

16. The light guide plate as claimed in claim 11, wherein the first and second directions are perpendicularly to each other.

* * * * *